(12) United States Patent
Wagner et al.

(10) Patent No.: US 12,514,284 B2
(45) Date of Patent: Jan. 6, 2026

(54) AEROSOL GENERATING ARTICLE

(71) Applicant: JT International SA, Geneva (CH)

(72) Inventors: Marcus Wagner, Hamburg (DE); Julia Schwanebeck, Geesthacht (DE); Martina Stamer, Grosshansdorf (DE); Marlo-Leander Schmidt, Hamburg (DE); Felix Seitz, Hamburg (DE)

(73) Assignee: JT International SA (CH)

( * ) Notice: Subject to any disclaimer, the term of this patent is extended or adjusted under 35 U.S.C. 154(b) by 340 days.

(21) Appl. No.: 18/026,981

(22) PCT Filed: Sep. 17, 2021

(86) PCT No.: PCT/EP2021/075599
§ 371 (c)(1),
(2) Date: Mar. 17, 2023

(87) PCT Pub. No.: WO2022/058486
PCT Pub. Date: Mar. 24, 2022

(65) Prior Publication Data
US 2023/0337727 A1    Oct. 26, 2023

(30) Foreign Application Priority Data
Sep. 21, 2020 (EP) .................................. 20197170

(51) Int. Cl.
*A24D 1/20* (2020.01)
*A24F 40/465* (2020.01)
(Continued)

(52) U.S. Cl.
CPC ............... *A24D 1/20* (2020.01); *H05B 6/108* (2013.01); *A24C 5/01* (2020.01); *A24F 40/20* (2020.01); *A24F 40/465* (2020.01)

(58) Field of Classification Search
CPC ................................. A24D 1/20; A24F 40/465
See application file for complete search history.

(56) References Cited

U.S. PATENT DOCUMENTS 10,912,329 B2 *  2/2021  Apetrei Birza ...... B65D 85/804
12,295,405 B2 *  5/2025  Batista .................... A24C 5/01
(Continued)

FOREIGN PATENT DOCUMENTS

CN        109936984 A     6/2019
CN        110430770 A    11/2019
(Continued)

OTHER PUBLICATIONS

International Search Report for PCT/EP2021/075599 mailed Jan. 4, 2022. 5 pgs.
(Continued)

*Primary Examiner* — Russell E Sparks
(74) *Attorney, Agent, or Firm* — Lerner David LLP

(57) ABSTRACT

An aerosol generating article includes: a plurality of elongate first strips including an aerosol generating material; at least one elongate second strip including an inductively heatable susceptor material; and at least one elongate carrier strip to which the at least one elongate second strip is adhered. Each of the plurality of elongate first strips has a width which is less than a width of the at least one elongate second strip and a width of the at least one elongate carrier strip is greater than the width of the at least one elongate second strip. The elongate first strips, the at least one elongate second strip and the at least one elongate carrier strip are arranged to form a rod-shaped aerosol generating article.

18 Claims, 10 Drawing Sheets

Figure 1A:
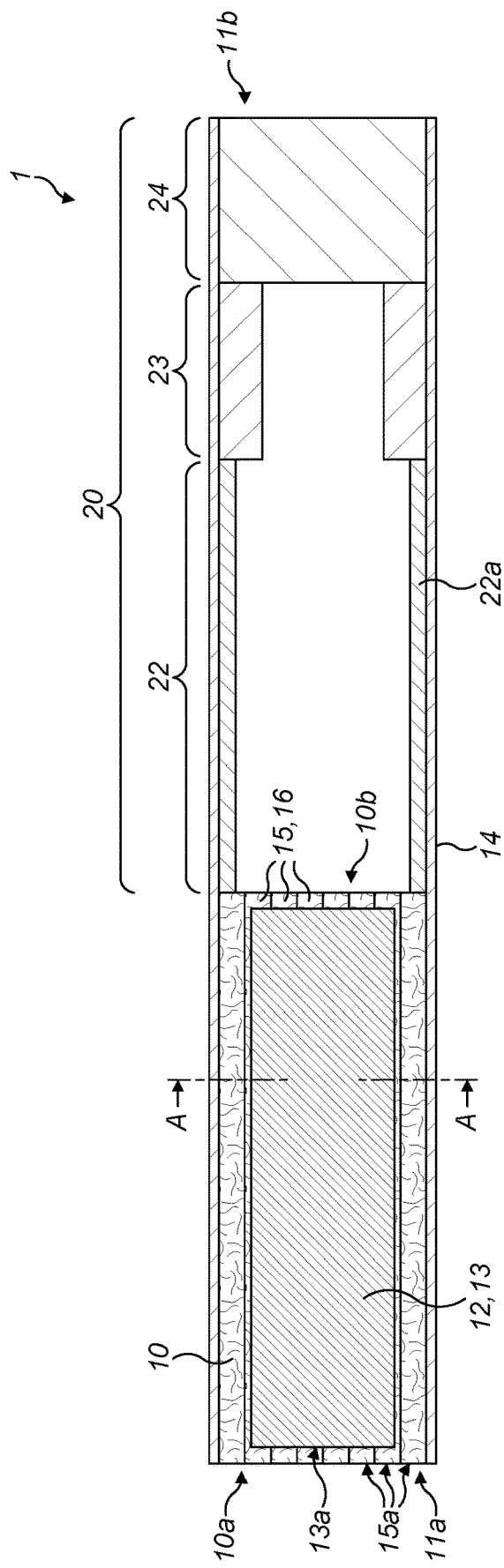
Figure 3:
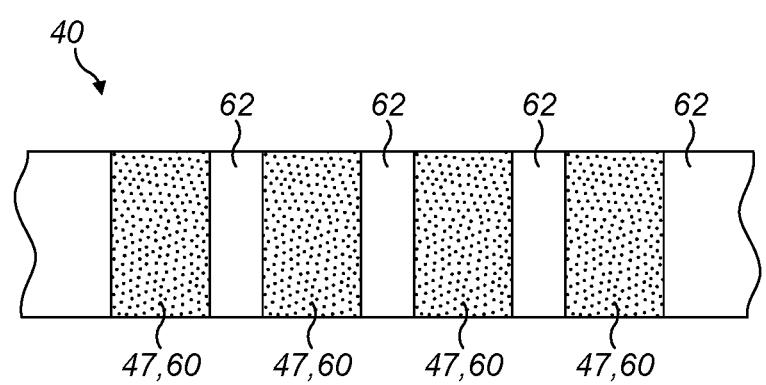
Figure 4:
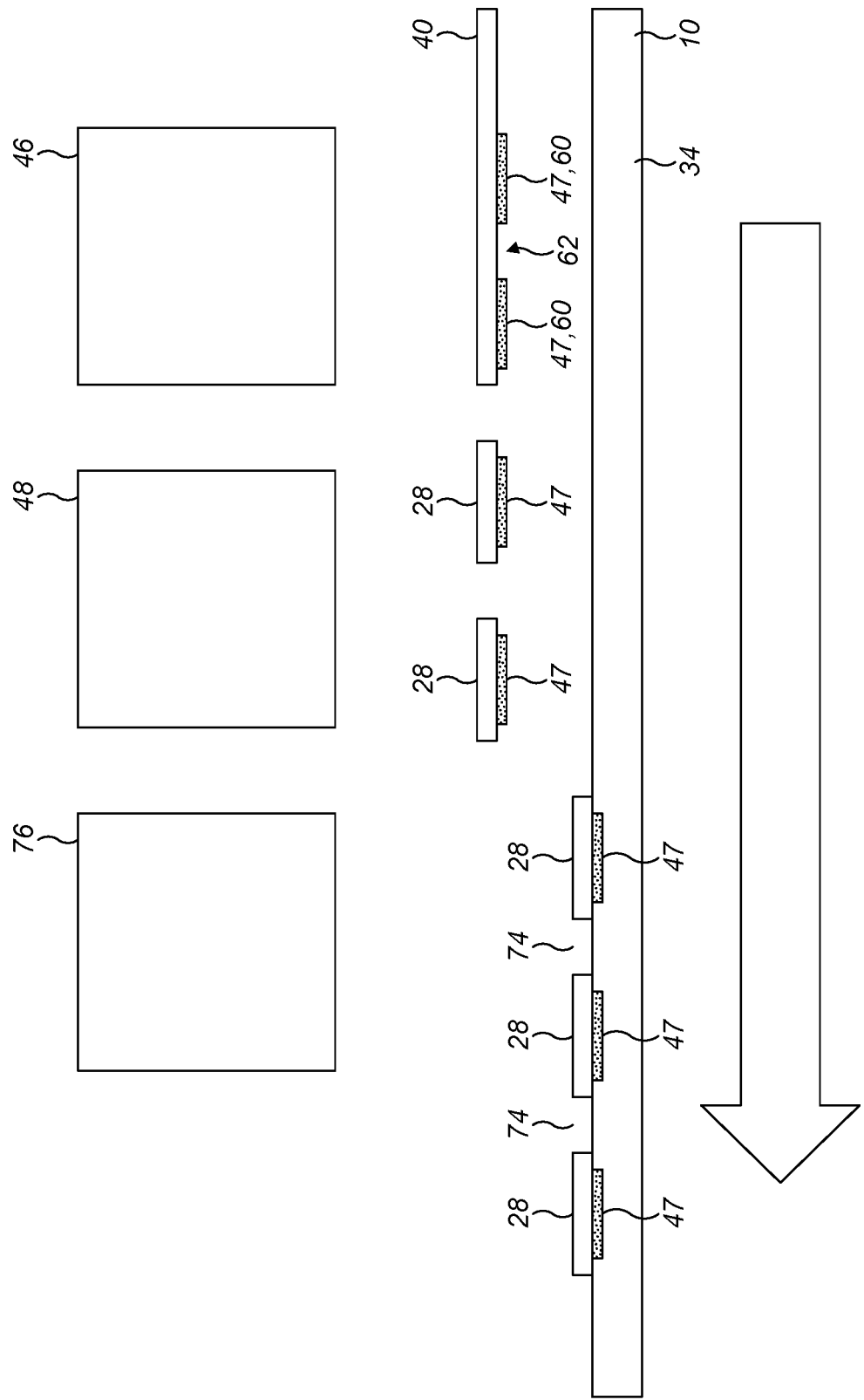
Figure 5:
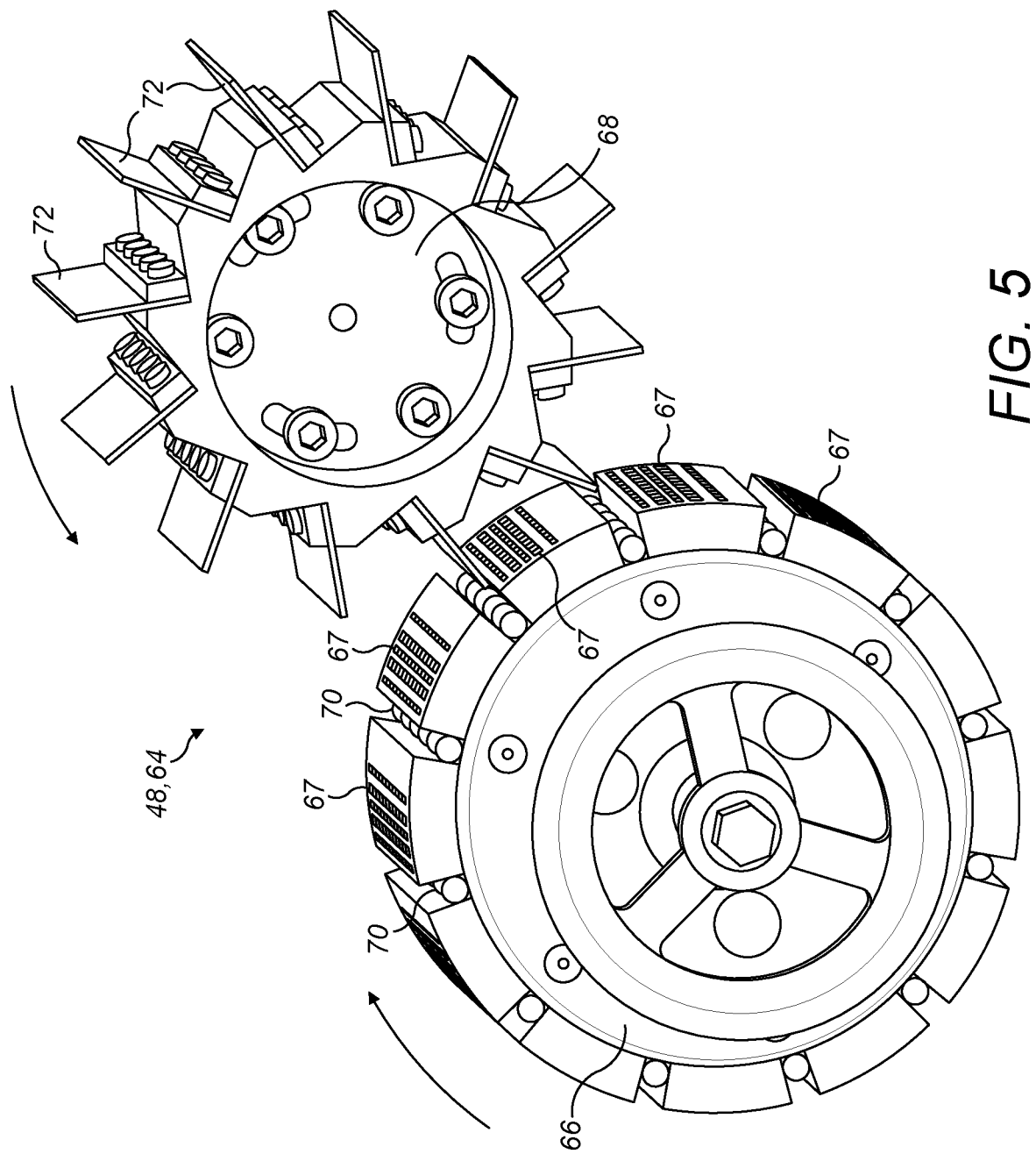

(51) Int. Cl.
  *H05B 6/10* (2006.01)
  *A24C 5/01* (2020.01)
  *A24F 40/20* (2020.01)

(56) References Cited

U.S. PATENT DOCUMENTS

| | | |
|---|---|---|
| 2016/0295917 A1 | 10/2016 | Malgat et al. |
| 2017/0055582 A1* | 3/2017 | Blandino ............... H05B 6/105 |
| 2018/0352851 A1 | 12/2018 | Prestia et al. |
| 2019/0053535 A1 | 2/2019 | Apetrei Birza |
| 2019/0124981 A1 | 5/2019 | Fursa |
| 2020/0093179 A1 | 3/2020 | Rossoll et al. |
| 2020/0114097 A1 | 4/2020 | Sanna et al. |
| 2021/0212364 A1 | 7/2021 | Batista et al. |
| 2021/0368859 A1 | 12/2021 | Watanabe |
| 2022/0132908 A1 | 5/2022 | Batista et al. |
| 2022/0408811 A1* | 12/2022 | Batista .................... A24F 40/42 |
| 2023/0012023 A1* | 1/2023 | Kabirat .................... A24F 40/57 |
| 2023/0050426 A1* | 2/2023 | Moloney ............... H05B 6/105 |
| 2023/0309607 A1 | 10/2023 | Vincent et al. |

FOREIGN PATENT DOCUMENTS

| | | |
|---|---|---|
| JP | 2018515113 A | 6/2018 |
| JP | 2019515659 A | 6/2019 |
| JP | 6705042 B1 | 6/2020 |
| WO | 2019129694 A1 | 7/2019 |
| WO | 2020020748 A1 | 1/2020 |
| WO | 2020109203 A1 | 6/2020 |
| WO | 2020115151 A1 | 6/2020 |
| WO | 2020174027 A1 | 9/2020 |

OTHER PUBLICATIONS

International Search Report for PCT/EP2021/075606 mailed Jan. 4, 2022. 4 pgs.
International Search Report for PCT/EP2021/075604 mailed Jan. 4, 2022. 4 pgs.

* cited by examiner

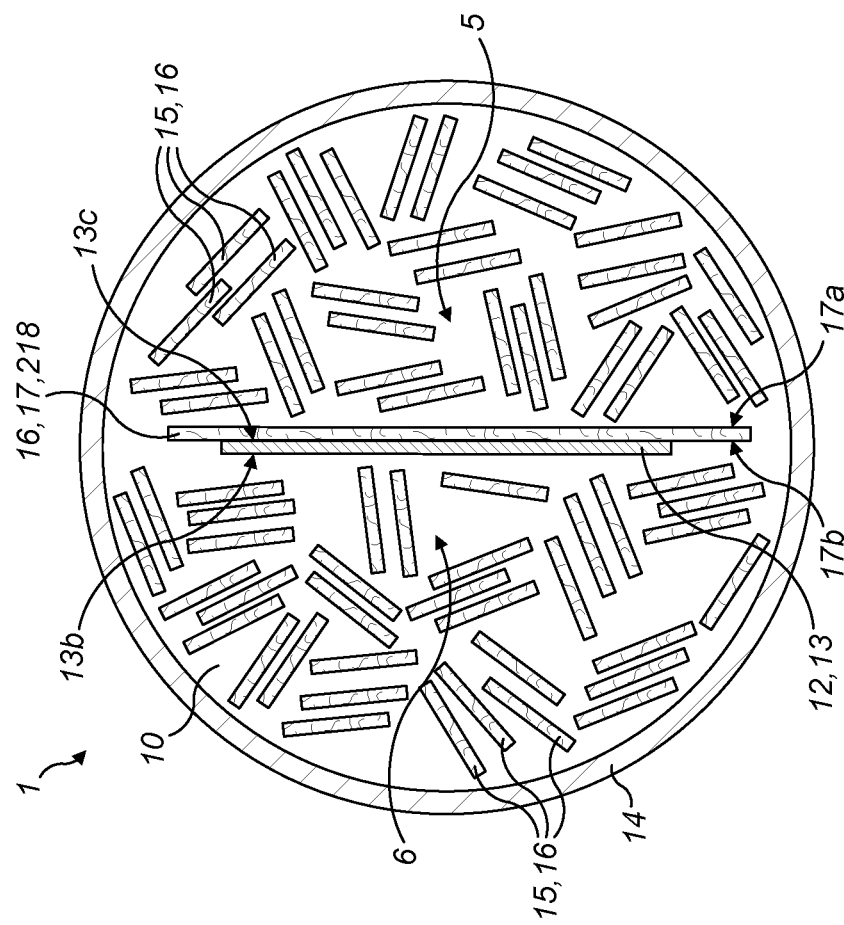

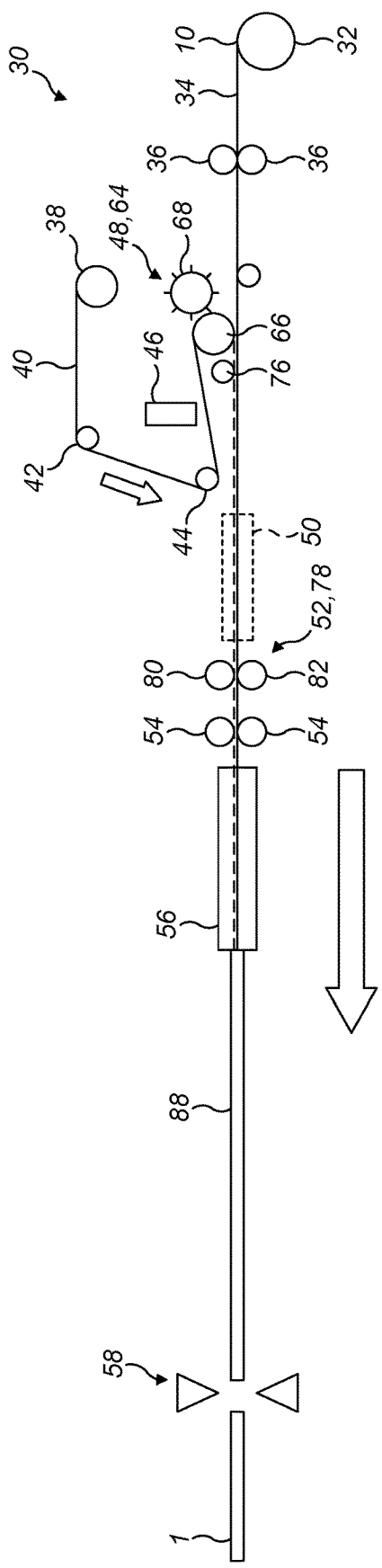
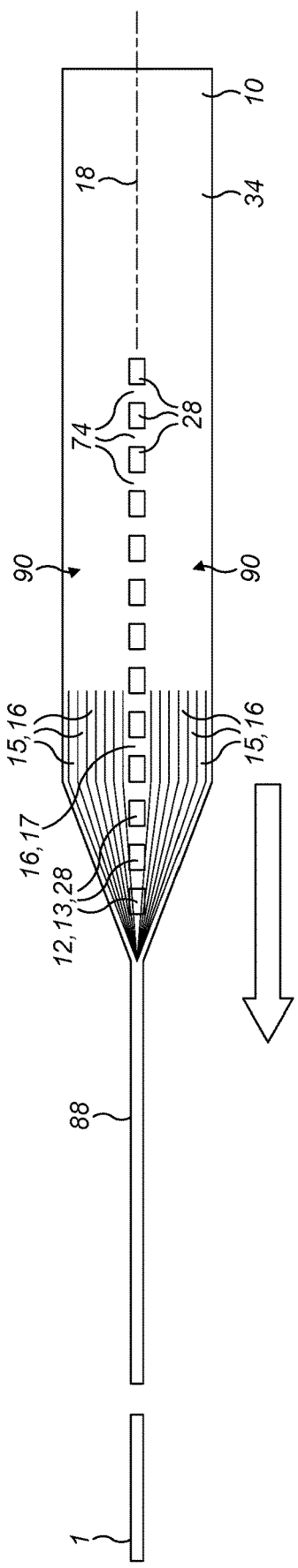
FIG. 2a
FIG. 2b

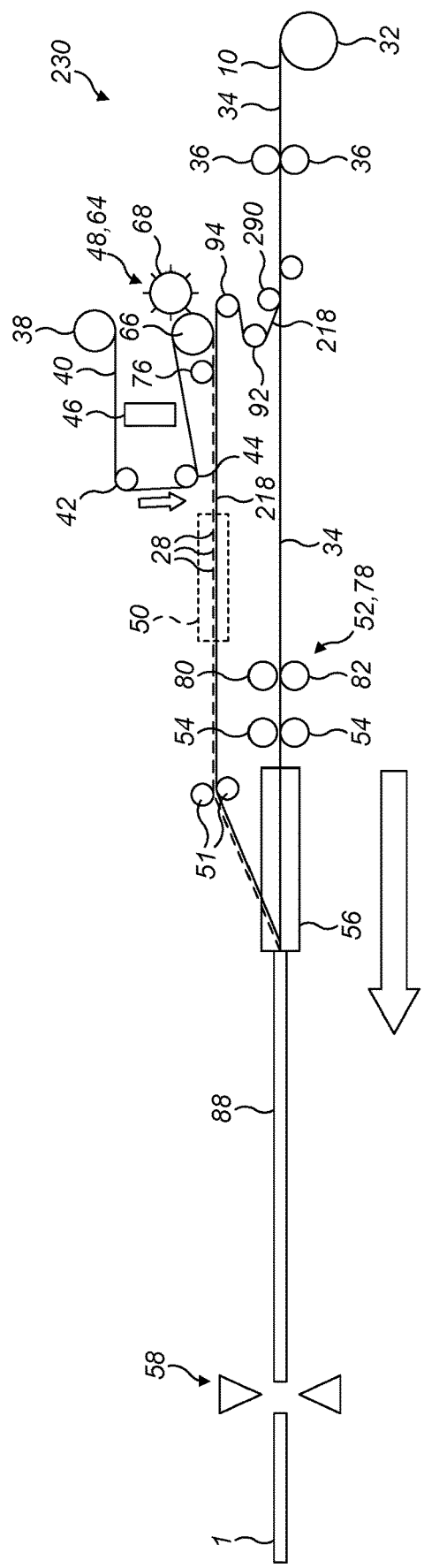
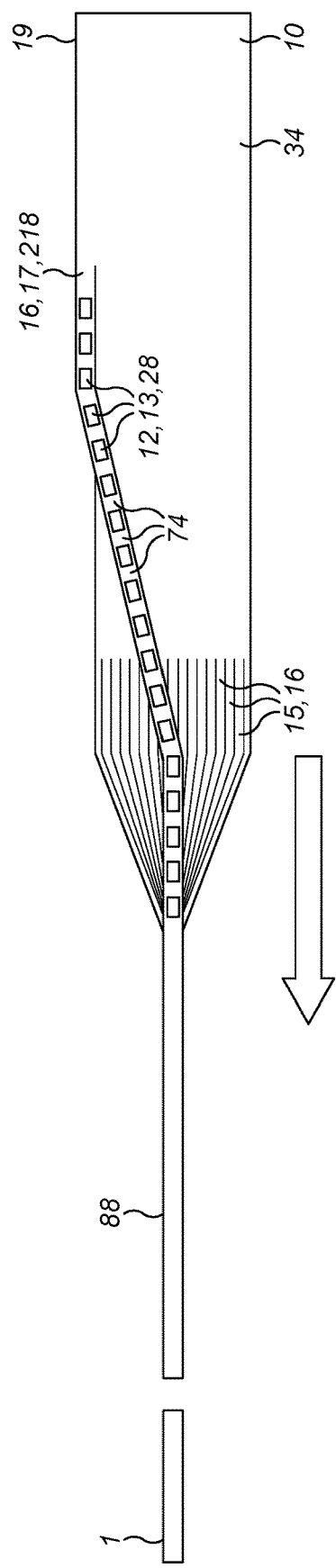
FIG. 7a
FIG. 7b

AEROSOL GENERATING ARTICLE

CROSS-REFERENCE TO RELATED APPLICATIONS

The present application is a national phase entry under 35 U.S.C. § 371 of International Application No. PCT/EP2021/075599, filed Sep. 17, 2021, published in English, which claims priority to European Application No. 20197170.2 filed Sep. 21, 2020.

TECHNICAL FIELD

The present disclosure relates generally to aerosol generating articles, and more particularly to an aerosol generating article for use with an aerosol generating device for heating the aerosol generating article to generate an aerosol for inhalation by a user. The present disclosure is particularly applicable to aerosol generating articles for use with a portable (hand-held) aerosol generating device.

TECHNICAL BACKGROUND

The popularity and use of reduced-risk or modified-risk devices (also known as aerosol generating devices or vapour generating devices) has grown rapidly in recent years as an alternative to the use of traditional tobacco products. Various devices and systems are available that heat or warm aerosol generating substances to generate an aerosol for inhalation by a user.

A commonly available reduced-risk or modified-risk device is the heated substrate aerosol generating device, or so-called heat-not-burn device. Devices of this type generate an aerosol or vapour by heating an aerosol generating substrate to a temperature typically in the range 150° C. to 300° C. Heating the aerosol generating substrate to a temperature within this range, without burning or combusting the aerosol generating substrate, generates a vapour which typically cools and condenses to form an aerosol for inhalation by a user of the device.

Currently available aerosol generating devices can use one of a number of different approaches to provide heat to the aerosol generating substrate. One such approach is to provide an aerosol generating device which employs an induction heating system. In such a device, an induction coil is provided in the device and an inductively heatable susceptor is provided to heat the aerosol generating substrate. Electrical energy is supplied to the induction coil when a user activates the device which in turn generates an alternating electromagnetic field. The susceptor couples with the electromagnetic field and generates heat which is transferred, for example by conduction, to the aerosol generating substrate and an aerosol is generated as the aerosol generating substrate is heated.

The characteristics of the aerosol generated by the aerosol generating device are dependent upon a number of factors, including the construction of the aerosol generating article used with the aerosol generating device. There is, therefore, a desire to provide an aerosol generating article which enables the characteristics of the aerosol generated during use of the article to be optimised. There is also a general desire to provide an aerosol generating article which can be mass-produced easily and consistently.

SUMMARY OF THE DISCLOSURE

According to a first aspect of the present disclosure, there is provided an aerosol generating article comprising:

a plurality of elongate first strips comprising an aerosol generating material;
at least one elongate second strip comprising an inductively heatable susceptor material; and
at least one elongate carrier strip to which the at least one elongate second strip is adhered;
wherein:
each of the plurality of elongate first strips has a width which is less than a width of the at least one elongate second strip,
a width of the at least one elongate carrier strip is greater than the width of the at least one elongate second strip, and
the elongate first strips, the at least one elongate second strip and the at least one elongate carrier strip are arranged to form a rod-shaped aerosol generating article.

The aerosol generating article is for use with an aerosol generating device for heating the aerosol generating material, without burning the aerosol generating material, to volatise at least one component of the aerosol generating material and thereby generate a heated vapour which cools and condenses to form an aerosol for inhalation by a user of the aerosol generating device. The aerosol generating device is a hand-held, portable, device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The combination of elongate first strips (aerosol generating strips) and a wider elongate second strip (elongate susceptor) in the aerosol generating article provides effective heat transfer from the elongate second strip to the elongate first strips during use of the aerosol generating article in an aerosol generating device. By adhering the elongate second strip to the wider elongate carrier strip, positioning of the elongate second strip relative to the elongate first strips is facilitated, and this further ensures effective heat transfer from the elongate second strip to the elongate first strips. Effective and uniform heating of the elongate first strips and, thus, reliable vapour generation is thereby achieved. Aerosol generating articles according to the present disclosure can also be manufactured efficiently, and mass produced with relative ease.

The at least one elongate second strip may have first and second opposite faces. One of the first and second opposite faces may be covered in its entirety by the at least one elongate carrier strip. The elongate second strip is thereby securely adhered to the elongate carrier strip enabling the elongate second strip and the elongate carrier strip to be reliably positioned relative to the elongate first strips.

The aerosol generating article may consist exclusively of one elongate second strip comprising an inductively heatable susceptor material. The elongate second strip may be located in a radially central position within the rod-shaped aerosol generating article and may extend along a longitudinal axis of the rod-shaped aerosol generating article. This arrangement may help to ensure that the elongate first strips surrounding the centrally positioned elongate second strip (elongate susceptor) are heated uniformly. It may also help to ensure that there is a good electromagnetic coupling between the elongate second strip (elongate susceptor) and an electromagnetic field generator (e.g., an induction coil) of an aerosol generating device during use of the aerosol generating article.

The elongate carrier strip and the elongate second strip adhered thereto may define first and second regions within the cross-section of the rod-shaped aerosol generating article. The elongate carrier strip may have a first major surface and may have a second major surface. The elongate second strip may be adhered to the second major surface. The first region may face the first major surface. The second region may face the second major surface. The first and second regions may both include a plurality of the elongate first strips. A large number of elongate first strips can be provided in the first and second regions on opposite sides of the elongate second strip and the elongate carrier strip. This may facilitate uniform heating of the elongate first strips in the first and second regions, and in turn ensure that an acceptable quantity of vapour is generated by the elongate first strips in the first and second regions.

Each of the plurality of elongate first strips may have a distal end and the at least one elongate second strip may have a distal end. The distal ends of the elongate first strips may form a distal end of the aerosol generating article. The distal end of the at least one elongate second strip may be positioned inwardly from the distal ends of the elongate first strips. For example, a length of the at least one elongate second strip may be less than a length of each of the elongate first strips. With this arrangement, the distal end of the elongate second strip (elongate susceptor) is not visible at the distal end of the aerosol generating article and this may improve the user acceptance of the aerosol generating article. Furthermore, because the elongate second strip (elongate susceptor) is fully embedded in the elongate first strips (aerosol generating strips), this may allow an aerosol or vapour to be generated more effectively because the elongate second strip is fully surrounded by the elongate first strips and, therefore, heat transfer from the elongate second strip to the elongate first strips is maximised.

A length of the at least one elongate carrier strip may be equal to a length of each of the elongate first strips. This may facilitate manufacture of the aerosol generating article.

The at least one elongate carrier strip may comprise an aerosol generating material. This may facilitate manufacture of the aerosol generating article and may also allow a maximum amount of vapour to be generated during use of the aerosol generating article due to heating of both the plurality of elongate first strips and the elongate carrier strip by heat transferred from the elongate second strip.

The elongate first strips may have a plurality of different orientations within the cross-section of the rod-shaped aerosol generating article. This may help to ensure a uniform heat transfer from the elongate second strip to the elongate first strips and, thus, allow a maximum amount of vapour to be generated during use of the aerosol generating article.

The at least one elongate second strip may have a thickness between 1 µm and 500 µm, preferably between 10 µm and 100 µm. An elongate second strip (elongate susceptor) having these thickness dimensions may be particularly suitable for being inductively heated during use of the aerosol generating article and may also facilitate manufacture of the aerosol generating article.

Each of the plurality of elongate first strips may have a length between 5 mm and 50 mm. Each of the plurality of elongate first strips may have a length between 10 mm and 30 mm.

Each of the plurality of elongate first strips may have a thickness between 50 µm and 500 µm, possibly between 150 µm and 300 µm. Each of the plurality of elongate first strips may have a thickness of 220 µm.

Each of the plurality of elongate first strips may have a width of between approximately 0.1 mm and 5.0 mm, possibly between 0.5 mm and 2.0 mm. Each of the plurality of elongate first strips may have a width of 1.0 mm. These width dimensions ensure that the aerosol generating article contains an optimum number of elongate first strips (aerosol generating strips) to ensure uniform airflow through the aerosol generating article and the generation of an acceptable quantity of vapour or aerosol. If the width of the elongate first strips (aerosol generating strips) is too low, the strength of the strips may be reduced and, consequently, mass production of aerosol generating articles may become difficult.

The inductively heatable susceptor material may comprise a metal. The metal is typically selected from the group consisting of stainless steel and carbon steel. The inductively heatable susceptor material could, however, comprise any suitable material including one or more, but not limited, of aluminium, iron, nickel, stainless steel, carbon steel, and alloys thereof, e.g. Nickel Chromium or Nickel Copper. With the application of an electromagnetic field in its vicinity during use of the aerosol generating article in an aerosol generating device, the elongate second strip (elongate susceptor) may generate heat due to eddy currents and magnetic hysteresis losses resulting in a conversion of energy from electromagnetic to heat.

The aerosol generating material may be any type of solid or semi-solid material. Example types of aerosol generating solids include powder, granules, pellets, shreds, strands, particles, gel, strips, loose leaves, cut leaves, cut filler, porous material, foam material or sheets. The aerosol generating material may comprise plant derived material and in particular, may comprise a tobacco. It may advantageously comprise reconstituted tobacco, for example including tobacco and any one or more of cellulose fibres, tobacco stalk fibres and inorganic fillers such as $CaCO_3$.

Consequently, the aerosol generating device with which the aerosol generating articles are intended for use may be referred to as a "heated tobacco device", a "heat-not-burn tobacco device", a "device for vaporising tobacco products", and the like, with this being interpreted as a device suitable for achieving these effects. The features disclosed herein are equally applicable to devices which are designed to vaporise any aerosol generating substrate.

The aerosol generating article may be circumscribed by a paper wrapper.

The aerosol generating article may be formed substantially in the shape of a stick, and may broadly resemble a cigarette, having a tubular region with an aerosol generating substrate arranged in a suitable manner. The aerosol generating article may include a filter segment, for example comprising cellulose acetate fibres, at a proximal end of the aerosol generating article. The filter segment may constitute a mouthpiece filter and may be in coaxial alignment with an aerosol generating substrate constituted primarily by the plurality of elongate first strips and optionally by the elongate carrier strip. One or more vapour collection regions, cooling regions, and other structures may also be included in some designs. For example, the aerosol generating article may include at least one tubular segment upstream of the filter segment. The tubular segment may act as a vapour cooling region. The vapour cooling region may advantageously allow the heated vapour generated by heating the aerosol generating strips (the elongate first strips and preferably the elongate carrier strip) to cool and condense to form an aerosol with suitable characteristics for inhalation by a user, for example through the filter segment.

The aerosol generating material may comprise an aerosol-former. Examples of aerosol-formers include polyhydric alcohols and mixtures thereof such as glycerine or propylene glycol. Typically, the aerosol generating material may comprise an aerosol-former content of between approximately 5% and approximately 50% on a dry weight basis. In some embodiments, the aerosol generating material may comprise an aerosol-former content of between approximately 10% and approximately 20% on a dry weight basis, and possibly approximately 15% on a dry weight basis.

Upon heating, the aerosol generating material may release volatile compounds. The volatile compounds may include nicotine or flavour compounds such as tobacco flavouring.

BRIEF DESCRIPTION OF THE DRAWINGS

FIG. 1*a* is a diagrammatic cross-sectional side view of an example of an aerosol generating article;

FIG. 1*b* is an enlarged diagrammatic cross-sectional view along the line A-A in FIG. 1*a;*

FIG. 2*a* is a diagrammatic illustration of a first embodiment of an apparatus and method for manufacturing the aerosol generating article illustrated in FIGS. 1*a* and 1*b;*

FIG. 2*b* is a plan view of an aerosol generating substrate and susceptor patches as the aerosol generating substrate and susceptor patches move in the direction shown by the arrow through the apparatus illustrated in FIG. 2*a;*

FIG. 3 is a plan view of a section of a continuous web of susceptor material showing adhesive areas and non-adhesive areas;

FIG. 4 is a functional illustration of part of the apparatus and method of FIG. 2*a* schematically illustrating the formation of susceptor patches from a continuous web of susceptor material and the application of the susceptor patches to a surface of a continuous web of aerosol generating substrate;

FIG. 5 is a diagrammatic perspective view of a susceptor cutting unit;

FIG. 6 is a diagrammatic illustration of a strip cutting unit of the apparatus of FIG. 2*a;*

FIG. 7*a* is a diagrammatic illustration of a second embodiment of an apparatus and method for manufacturing the aerosol generating article illustrated in FIGS. 1*a* and 1*b;*

FIG. 7*b* is a plan view of an aerosol generating substrate and susceptor patches as the aerosol generating substrate and susceptor patches move in the direction shown by the arrow through the apparatus illustrated in FIG. 7*a;*

FIG. 8 is a functional illustration of part of the apparatus and method of FIG. 7*a* schematically illustrating the formation of susceptor patches from a continuous web of susceptor material and the application of the susceptor patches to a surface of a continuous strip of aerosol generating substrate; and FIG. 9 is a diagrammatic illustration of a strip cutting unit of the apparatus of FIG. 7*a*.

DETAILED DESCRIPTION OF EMBODIMENTS

Embodiments of the present disclosure will now be described by way of example only and with reference to the accompanying drawings.

Referring initially to FIGS. 1*a* and 1*b*, there is shown an example of an aerosol generating article 1 for use with an aerosol generating device that comprises an induction heating system to inductively heat the aerosol generating article and thereby generate an aerosol for inhalation by a user of the device. Such devices are known in the art and will not be described in further detail in this specification. The aerosol generating article 1 is elongate, having a distal end 11*a* and a proximal end (or mouth end) 11*b*, and is substantially cylindrical. The circular cross-section facilitates handling of the article 1 by a user and insertion of the article 1 into a cavity or heating compartment of an aerosol generating device.

The aerosol generating article 1 comprises an aerosol generating substrate 10 having first and second ends 10*a*, 10*b* and an inductively heatable susceptor 12. The aerosol generating substrate 10 and the inductively heatable susceptor 12 are positioned in, and enclosed by, a wrapper 14. The wrapper 14 comprises a material which is substantially non-electrically conductive and non-magnetically permeable. In the illustrated example, the wrapper 14 is a paper wrapper and may comprise cigarette paper.

The aerosol generating article 1 typically has a total length, measured between the distal end 11*a* and the proximal (mouth) end 11*b*, between 30 mm and 100 mm, preferably between 50 mm and 70 mm. The aerosol generating substrate 10 typically has a total length, measured between the first and second ends 10*a*, 10*b*, between 5 mm and 50 mm, preferably between 10 mm and 30 mm. The aerosol generating article 1 typically has a diameter between 5 mm and 10 mm, preferably between 6 mm and 8 mm.

The aerosol generating substrate 10 comprises a plurality of elongate first strips 15 comprising an aerosol generating material. The plurality of elongate first strips 15 constitute aerosol generating strips 16 and are substantially oriented in a longitudinal direction of the aerosol generating article 1. The elongate first strips 15 are typically foldless in the longitudinal direction to ensure that the air flow route is not interrupted and that a uniform air flow through the article 1 can be achieved.

The inductively heatable susceptor 12 comprises an elongate second strip 13 comprising an inductively heatable susceptor material. The elongate second strip 13 can, therefore, be regarded as a strip-shaped or blade-shaped elongate susceptor 12 which is also substantially oriented in the longitudinal direction of the aerosol generating article 1. As can be clearly seen in FIG. 1*b*, each of the elongate first strips 15 has a width which is less than a width of the elongate second strip 13.

The aerosol generating article 1 comprises at least one elongate carrier strip 17 having first and second major surfaces 17*a*, 17*b*. The elongate carrier strip 17 comprises an aerosol generating material and, thus, also constitutes an aerosol generating strip 16. The elongate carrier strip 17 is substantially oriented in the longitudinal direction of the aerosol generating article 1. The elongate carrier strip 17 has the same length as the elongate first strips 15, and thus the aerosol generating strips 16 within the aerosol generating article 1 all have the same length.

The elongate second strip 13 is adhered to the elongate carrier strip 17 and, as can be clearly seen in FIG. 1*b*, the elongate carrier strip 17 has a width which is greater than the width of the elongate second strip 13. The elongate second strip 13 has first and second opposite faces 13*b*, 13*c*. The second face 13*c* is adhered to the second major surface 17*b* of the elongate carrier strip 17 and is covered in its entirety by the elongate carrier strip 17, and more particularly by the second major surface 17*b*.

The elongate first strips 15, the elongate second strip 13 and the elongate carrier strip 17 are arranged to form a substantially rod-shaped aerosol generating article 1 and the elongate first strips 15 can be randomly distributed throughout the cross-section of the rod-shaped aerosol generating article 1 such that they have a plurality of different orientations within the cross-section of the aerosol generating article 1. Although not apparent from FIG. 1b, a sufficient number of elongate first strips 15 are provided to substantially fill the cross-section of the aerosol generating substrate 10, and it will be understood that a smaller number of elongate first strips 15 are shown merely for illustration purposes. The elongate second strip 13 and the elongate carrier strip 17 are positioned roughly centrally within the cross-section of the aerosol generating substrate 10, and hence the aerosol generating article 1. Such an arrangement helps to ensure that there is uniform heat transfer from the elongate second strip 13 to the elongate first strips 15.

As best seen in FIG. 1b, the centrally positioned elongate carrier strip 17 and the elongate second strip 13 adhered thereto define first and second regions 5, 6 within the cross-section of the aerosol generating substrate 10 and, hence, within the cross-section of the aerosol generating article 1. The first region 5 faces the first major surface 17a of the elongate carrier strip 17 and the second region 6 faces the second major surface 17b of the elongate carrier strip 17. The first and second regions 5, 6 both include a plurality of elongate first strips 15.

As best seen in FIG. 1a, each of the plurality of elongate first strips 15 has a distal end 15a and the elongate second strip 13 has a distal end 13a. The distal ends 15a of the elongate first strips 15 form the first end 10a of the aerosol generating substrate 10 and, correspondingly, the distal end 11a of the aerosol generating article 1. The elongate second strip 13 is shorter than the elongate first strips 15 and the elongate carrier strip 17. The distal end 13a of the elongate second strip 13 is positioned inwardly from the distal ends 15a of the elongate first strips 15. The distal end 13a of the elongate second strip 13 (i.e., the elongate susceptor 12) is, therefore, not visible at the distal end 11a of the aerosol generating article 1.

The aerosol generating article 1 comprises a mouthpiece segment 20 positioned downstream of the aerosol generating substrate 10. The aerosol generating substrate 10 and the mouthpiece segment 20 are arranged in coaxial alignment inside the wrapper 14 to hold the components in position to form the rod-shaped aerosol generating article 1.

In the illustrated embodiment, the mouthpiece segment 20 comprises the following components arranged sequentially and in co-axial alignment in a downstream direction, in other words from the distal end 11a to the proximal (mouth) end 11b of the aerosol generating article 1: a cooling segment 22, a center hole segment 23 and a filter segment 24. The cooling segment 22 comprises a hollow paper tube 22a having a thickness which is greater than the thickness of the paper wrapper 14. The center hole segment 23 may comprise a cured mixture containing cellulose acetate fibres and a plasticizer, and functions to increase the strength of the mouthpiece segment 20. The filter segment 24 typically comprises cellulose acetate fibres and acts as a mouthpiece filter. As heated vapour flows from the aerosol generating substrate 10 towards the proximal (mouth) end 11b of the aerosol generating article 1, the vapour cools and condenses as it passes through the cooling segment 22 and the center hole segment 23 to form an aerosol with suitable characteristics for inhalation by a user through the filter segment 24.

The elongate first strips 15 and the elongate carrier strip 17 typically comprise plant derived material, such as tobacco. The elongate first strips 15 and the elongate carrier strip 17 can advantageously comprise reconstituted tobacco including tobacco and any one or more of cellulose fibres, tobacco stalk fibres and inorganic fillers such as CaCO3.

The elongate first strips 15 and the elongate carrier strip 17 typically comprise an aerosol-former such as glycerine or propylene glycol. Typically, the elongate first strips 15 and the elongate carrier strip 17 comprise an aerosol-former content of between approximately 5% and approximately 50% on a dry weight basis. Upon heating, the elongate first strips 15 and the elongate carrier strip 17 release volatile compounds possibly including nicotine or flavour compounds such as tobacco flavouring.

When a time varying electromagnetic field is applied in the vicinity of the elongate second strip 13 during use of the article 1 in an aerosol generating device, heat is generated in the elongate second strip 13 due to eddy currents and magnetic hysteresis losses. The heat is transferred from the elongate second strip 13 to the elongate first strips 15 and the elongate carrier strip 17 to heat the elongate first strips 15 and the elongate carrier strip 17 without burning them to release one or more volatile compounds and thereby generate a vapour. As a user inhales through the filter segment 24, the heated vapour is drawn in a downstream direction through the article 1 from the first end 10a of the aerosol generating substrate 10 towards the second end 10b of the aerosol generating substrate 10, and towards the filter segment 24. As noted above, as the heated vapour flows through the cooling segment 22 and the center hole segment 23 towards the filter segment 24, the heated vapour cools and condenses to form an aerosol with suitable characteristics for inhalation by a user through the filter segment 24.

Apparatus 30, 230 and methods suitable for manufacturing aerosol generating articles according to the present disclosure, such as the aerosol generating article 1 described above with reference to FIGS. 1a and 1b, will now be described.

Manufacture of Aerosol Generating Articles: Embodiment 1

Referring to FIG. 2a, there is shown a diagrammatic illustration of an apparatus 30 and method for manufacturing the aerosol generating article 1 described above with reference to FIGS. 1a and 1b. FIG. 2b is a plan view of an aerosol generating substrate 10 and susceptor patches 28 as they move through the apparatus 30, in the direction of the arrow in FIG. 2b.

The apparatus 30 comprises a substrate supply reel 32 (e.g. a first bobbin) which carries a continuous web 34 of an aerosol generating substrate 10 having a substantially flat surface with a centre line 18 and first feed rollers 36 for controlling the feed of the continuous web 34 of aerosol generating substrate 10. The apparatus 30 may also include a web tension regulator and a web edge control system as will be understood by one of ordinary skill in the art, but these additional components are not essential in the context of the present disclosure and have, therefore, been omitted for the sake of simplicity.

The apparatus 30 comprises a susceptor supply reel 38 (e.g. a second bobbin) which carries a continuous web 40 of susceptor material, feed rollers 42, 44 for controlling the feed of the continuous web 40 of susceptor material, an adhesive applicator unit 46, and a susceptor cutting unit 48.

The apparatus 30 further comprises an optional heater 50, a strip cutting unit 52, feed rollers 54, a rod forming unit 56, and a rod cutting unit 58.

Susceptor Patch Preparation

In operation, a continuous web 34 of aerosol generating substrate 10 is continuously supplied from the substrate supply reel 32. At the same time, a continuous web 40 of susceptor material is continuously supplied from the susceptor supply reel 38, via the feed rollers 42, 44, to the adhesive applicator unit 46. The adhesive applicator unit 46 applies an adhesive 47 to a surface of the continuous web 40 of susceptor material. In the illustrated example, the adhesive applicator unit 46 applies the adhesive 47 to the surface of the continuous web 40 of susceptor material intermittently, and across the full width of the web 40. In this way, discrete adhesive areas 60 (see FIGS. 3 and 4) are formed on the surface of the continuous web 40 of susceptor material, with adhesive-free areas 62 being formed between adjacent adhesive areas 60 in the direction of travel of the continuous web 40 of susceptor material.

The continuous web 40 of susceptor material is supplied from the adhesive applicator unit 46 to the susceptor cutting unit 48 which continuously cuts the continuous web 40 of susceptor material to form a plurality of susceptor patches 28. As best seen in FIG. 2*b*, the continuous web 40 of susceptor material, and hence the susceptor patches 28, have a width which is substantially less than a width of the continuous web 34 of aerosol generating substrate 10. For example, the continuous web 34 of aerosol generating substrate 10 can have a width of approximately 140 mm whereas the continuous web of susceptor material, and hence the susceptor patches 28, can have a width of between approximately 0.1 mm and 7 mm. In some embodiments, the susceptor patches 28 can have a length of between approximately 5 mm and 50 mm in the direction of travel of the continuous web 40 of susceptor material and can have a thickness of between approximately 1 μm and 500 μm.

In order to minimise soiling of the susceptor cutting unit 48 by the adhesive 47 applied to the continuous web 40 of susceptor material by the adhesive applicator unit 46, the susceptor cutting unit 48 cuts the continuous web 40 of susceptor material in the adhesive-free areas 62, that is at positions between the adhesive areas 60 on the surface of the continuous web 40 of susceptor material. This can be achieved by synchronising the operation of the susceptor cutting unit 48 with the movement of the continuous web of susceptor material.

Referring to FIG. 5, the susceptor cutting unit 48 comprises a rotary cutting unit 64 comprising a support drum 66 and a cutting drum 68. The support drum 66 supports the continuous web 40 of susceptor material around its periphery and includes a plurality of circumferentially spaced recesses 70 around its periphery. The support drum 66 is typically a suction drum and the continuous web 40 of susceptor material and susceptor patches 28 are supported around the periphery of the suction drum by a suction force applied through suction ports 67. The cutting drum 68 includes a plurality of circumferentially spaced cutting elements 72, for example projecting cutting blades, around its periphery and the cutting elements 72 cooperate with (e.g., extend into) the circumferentially spaced recesses 70 during synchronised rotation of both the support drum 66 and the cutting drum 68 in opposite directions as shown by the arrows in FIG. 5. This results in continuous shear cutting of the continuous web 40 of susceptor material to form a plurality of susceptor patches 28. As will become apparent from the description below, each susceptor patch 28 corresponds to the elongate second strip 13 (i.e., the elongate susceptor 12) in the finished aerosol generating article 1 described above with reference to FIGS. 1*a* and 1*b*.

Susceptor Patch Application

The susceptor patches 28 provided by the susceptor cutting unit 48 can be applied to the surface of the continuous web 34 of aerosol generating substrate 10 so that there is a constant and predetermined spacing 74 between the edges of each successive susceptor patch 28, for example as shown in FIGS. 2*b* and 4. The constant and predetermined spacing 74 may, for example, be between 1 mm and 20 mm. In order to generate the constant and predetermined spacing 74 between the edges of adjacent susceptor patches 28, the susceptor cutting unit 48 permits relative movement between the continuous web 40 of susceptor material and the support drum 66 for a predetermined period of time immediately after the continuous web 40 of susceptor material carried by the support drum 66 has been cut by the cutting drum 68 to form a susceptor patch 28. This relative movement allows the continuous web 40 of susceptor material to remain stationary or to travel at a reduced speed for a short period of time after a susceptor patch 28 has been cut from the continuous web 40 of susceptor material. The relative movement between the continuous web 40 of susceptor material and the support drum 66 can be achieved by, for example, reducing the suction force applied to the continuous web 40 of susceptor material by the support drum 66, whilst at the same time maintaining an adequate suction force between the already cut susceptor patches 28 and the support drum 66 to ensure that there is no relative movement between the susceptor patches 28 and the support drum 66. In this way, a susceptor patch 28 that has been cut from the continuous web 40 of susceptor material by the susceptor cutting unit 48 is conveyed for a short period of time at a greater speed than the continuous web 40 of susceptor material from which the susceptor patch 28 has been cut, thereby generating the desired constant and predetermined spacing 74 between the edges of adjacent susceptor patches 28.

The susceptor patches 28 with the adhesive 47 applied thereto are continuously and consecutively adhered to the flat surface of the continuous web 34 of aerosol generating substrate 10 substantially along the centre line 18. Exposed side regions 90 of the continuous web 34 of aerosol generating substrate are thereby formed on both sides of the susceptor patches 28 (see FIG. 2*b*) because, as noted above, the continuous web 34 of aerosol generating substrate 10 is substantially wider than the susceptor patches 28. Adjacent susceptor patches 28 are also spaced apart in the direction of travel of the continuous web 34 of aerosol generating substrate 10 by the constant and predetermined spacing 74 between the edges of the susceptor patches 28 that is generated when the susceptor patches 28 are formed in the susceptor cutting unit 48.

In order to ensure that there is adequate adhesion between the susceptor patches 28 and the substantially flat surface of the continuous web 34 of aerosol generating substrate 10, the susceptor patches 28 can be pressed onto the substantially flat surface by a cam roller 76, shown diagrammatically in FIG. 2*a*. The rotation of the cam roller 76 is synchronized with the movement of the continuous web 34 of aerosol generating substrate 10 so that a pressing force is applied to consecutive susceptor patches 28, but not to the spaced regions between consecutive susceptor patches 28.

Depending on the properties of the adhesive 47 applied to the continuous web 40 of susceptor material (and hence to the susceptor patches 28) by the adhesive applicator unit 46, the continuous web 34 of aerosol generating substrate 10 and the susceptor patches 28 adhered to the surface thereof can be heated by the optional heater 50. This may help to cure or set the adhesive 47, and thereby ensure a good bond between each susceptor patch 28 and the flat surface of the continuous web 34 of aerosol generating substrate 10. The heating temperature must be carefully selected based on the characteristics of both the aerosol generating substrate 10 and the adhesive 47, to ensure that sufficient heating is achieved to cure or set the adhesive 47, whilst at the same time avoiding or at least minimising the release of volatile components from the aerosol generating substrate 10.

Strip Cutting

The continuous web 34 of aerosol generating substrate 10 with the spaced susceptor patches 28 adhered to its flat surface is fed to the strip cutting unit 52. The strip cutting unit 52 cuts only the exposed side regions 90 of the continuous web 34 of aerosol generating substrate 10, without cutting the susceptor patches 28, to form a plurality of continuous aerosol generating strips 16 alongside the susceptor patches 28. In an embodiment, the strip cutting unit 52 cuts the exposed side regions 90 of the continuous web 34 of aerosol generating substrate 10 to form aerosol generating strips 16 having a strip width of approximately 1 mm.

Figure 6:
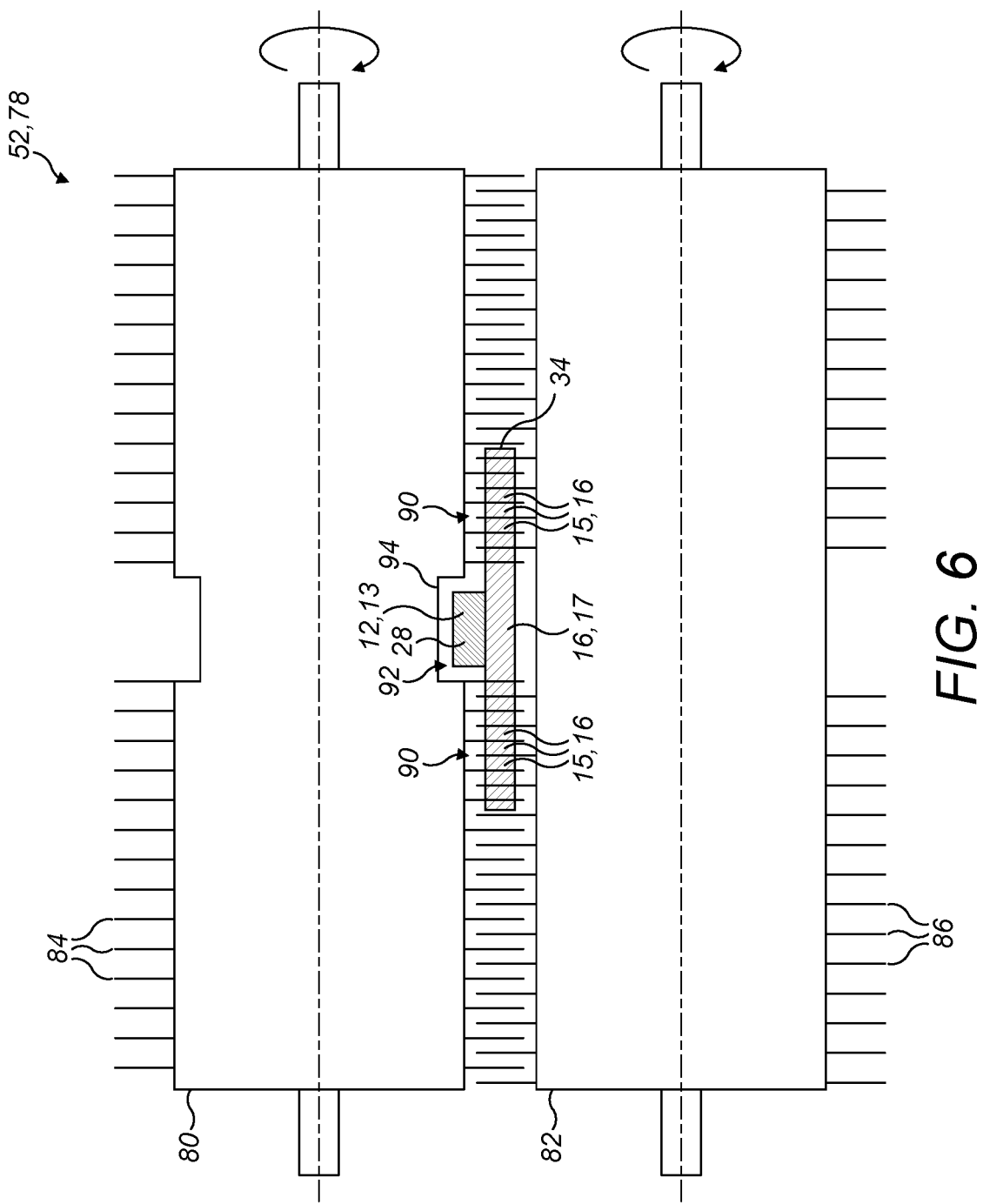

As shown in FIGS. 2a and 6, the strip cutting unit 52 is a rotary cutter unit 78 and comprises first and second cutting drums 80, 82. The first cutting drum 80 includes circumferentially extending first cutting formations 84 and the second cutting drum 82 includes circumferentially extending second cutting formations 86. The first and second cutting formations 84, 86 cooperate (e.g., intermesh) to shear cut the exposed side regions 90 of the continuous web 34 of aerosol generating substrate 10 in the direction of travel of the continuous web 34 to form the continuous aerosol generating strips 16, and specifically to form the elongate first strips 15 illustrated in FIGS. 1a and 1b.

In order to provide for cutting of only the exposed side regions 90 of the continuous web 34 of aerosol generating substrate 10 to form the elongate first strips 15, the first and second cutting drums 80, 82 define therebetween a non-cutting region 92 which accommodates the susceptor patch 28 and the part of the continuous web 34 of aerosol generating substrate 10 to which the susceptor patch 28 is adhered. In the illustrated embodiment, the first cutting drum 80 is formed without the first cutting formations 84 in the non-cutting region 92. Similarly, the second cutting drum 82 is also formed without the second cutting formations 86 in the non-cutting region 92. Furthermore, the first cutting drum 80 includes a circumferentially extending recess 94 in its surface in the non-cutting region 92, so that at least part of the susceptor patch 28 can be accommodated in the circumferentially extending recess 94 during cutting of the exposed side regions 90 of the continuous web 34 of aerosol generating substrate 10. It will, thus, be understood that when the exposed side regions 90 of the continuous web 34 of aerosol generating substrate 10 are cut to form the elongate first strips 15 by virtue of the cooperation between the first and second cutting formations 84, 86 on the first and second cutting drums 80, 82 respectively, the central portion of the continuous web 34 of aerosol generating substrate 10 that is accommodated in the non-cutting region 92 and that is not cut into strips constitutes the elongate carrier strip 17 described above with reference to FIG. 1b.

Rod Formation

The aerosol generating strips 16 formed by cutting the exposed side regions 90 of the continuous web 34 of aerosol generating substrate 10, the elongate carrier strip 17 and the adhered susceptor patches 28 are conveyed to the rod forming unit 56 where they are formed into a continuous rod 88. If desired, a continuous sheet of wrapping paper (not shown) can be supplied to the rod forming unit 56 from a supply reel (not shown) or can be supplied to a separate wrapping unit (again from a supply reel) which can be positioned downstream of the rod forming unit 56. As the sheet of wrapping paper is transported and guided through the rod forming unit 56 or the separate wrapping unit, it can be wrapped around the aerosol generating strips 16 and the susceptor patches 28 so that the continuous rod 88 is circumscribed by a wrapper 14.

Rod Cutting

The continuous rod 88 (optionally circumscribed by a wrapper 14) is then transported to the rod cutting unit 58 where it is cut at appropriate positions into predetermined lengths to form multiple aerosol generating articles 1. The aerosol generating articles 1 formed by the rod cutting unit 58 may have a length between 5 mm and 50 mm, preferably between 10 mm and 30 mm. It will be understood that this length corresponds to the length of the aerosol generating substrate 10 described above with reference to FIGS. 1a and 1b. The continuous rod 88 is preferably cut repeatedly by the rod cutting unit 58 substantially at a midpoint between the edges of the susceptor patches 28. In this way, the susceptor patches 28 are not cut by the rod cutting unit 58, thereby reducing wear on the cutting elements. Further, because the susceptor patches 28 are shorter than the aerosol generating strips 16, the ends of the individual susceptor patches 28 (i.e., the elongate second strips 13) are not visible at either end of the aerosol generating articles 1 formed by the rod cutting unit 58. It will be understood that this type of method is particularly suitable for the mass production of aerosol generating articles 1.

Final Assembly

Further units (not shown) may be arranged downstream of the rod cutting unit 58 and may be configured to provide one or more additional components such as the mouthpiece segment 20 described above and to assemble these with the individual aerosol generating articles 1 formed by the rod cutting unit 56 to form finished aerosol generating articles 1, for example of the type illustrated in FIG. 1. In this case, a separate wrapping unit may be provided downstream of the rod cutting unit 58 so that the assembled components can be simultaneously wrapped to form the finished aerosol generating articles 1. The further units may form part of the apparatus 30 or may be separate, stand-alone, units forming part of a final assembly line.

Manufacture of Aerosol Generating Articles: Embodiment 2

Referring to FIG. 7a, there is shown a diagrammatic illustration of a second embodiment of an apparatus 230 and method for manufacturing the aerosol generating article 1 described above with reference to FIGS. 1a and 1b. FIG. 7b is a plan view of an aerosol generating substrate 10 and susceptor patches 28 as they move through the apparatus 230, in the direction of the arrow in FIG. 7b. The apparatus 230 and method are similar to the apparatus 30 and method described above with reference to FIGS. 2 to 6 and corresponding components will be identified using the same reference numerals.

The apparatus 230 comprises a substrate supply reel 32 (e.g. a first bobbin) which carries a continuous web 34 of an aerosol generating substrate 10 having a substantially flat surface and first feed rollers 36 for controlling the feed of the continuous web 34 of aerosol generating substrate 10. The apparatus 230 may also include a web tension regulator and a web edge control system as will be understood by one of ordinary skill in the art, but these additional components are not essential in the context of the present disclosure and have, therefore, been omitted for the sake of simplicity.

The apparatus 230 further comprises a rotary cutter unit 290, for example including a circular cutting knife, which cuts the continuous web 34 of aerosol generating substrate along one edge 19 to separate a continuous strip 218 of aerosol generating substrate from the continuous web 34. The continuous strip 218 of aerosol generating substrate 10 corresponds to the elongate carrier strip 17 in the finished aerosol generating article 1 described above with reference to FIGS. 1a and 1b. The continuous strip 218 of aerosol generating substrate 10 has a substantially flat surface and is transported away from the continuous web 34 of aerosol generating substrate 10, for example in an upward direction as best seen in FIG. 7a, by transport rollers 92, 94 so that the continuous strip 218 and the continuous web 34 can be processed separately by the apparatus 230.

The apparatus 230 also comprises a susceptor supply reel 38 (e.g. a second bobbin) which carries a continuous web 40 of susceptor material, feed rollers 42, 44 for controlling the feed of the continuous web 40 of susceptor material, an adhesive applicator unit 46, and a susceptor cutting unit 48.

The apparatus 230 further comprises an optional heater 50, feed rollers 51, a strip cutting unit 52, feed rollers 54, a rod forming unit 56, and a rod cutting unit 58.

Susceptor Patch Preparation

In operation, a continuous web 34 of aerosol generating substrate 10 is continuously supplied from the substrate supply reel 32 and a continuous strip 218 of aerosol generating substrate 10 is separated from an edge 19 of the continuous web 34 by the rotary cutter unit 290 and transported away from the continuous web 34 by the transport rollers 92, 94 as described above. At the same time, a continuous web 40 of susceptor material is continuously supplied from the susceptor supply reel 38, via the feed rollers 42, 44, to the adhesive applicator unit 46. The adhesive applicator unit 46 applies an adhesive 47 to a surface of the continuous web 40 of susceptor material. In the illustrated example, the adhesive applicator unit 46 applies the adhesive 47 to the surface of the continuous web 40 of susceptor material intermittently, and across the full width of the web 40. In this way, discrete adhesive areas 60 (see FIGS. 3 and 8) are formed on the surface of the continuous web 40 of susceptor material, with adhesive-free areas 62 being formed between adjacent adhesive areas 60 in the direction of travel of the continuous web 40 of susceptor material.

The continuous web 40 of susceptor material is supplied from the adhesive applicator unit 46 to the susceptor cutting unit 48 which continuously cuts the continuous web 40 of susceptor material to form a plurality of susceptor patches 28. The construction and operation of the susceptor cutting unit 48 is the same as that described above in connection with FIG. 5. As will become apparent from the description below, each susceptor patch 28 corresponds to the elongate second strip 13 (i.e., the elongate susceptor 12) in the finished aerosol generating article 1 described above with reference to FIGS. 1a and 1b.

As best seen in FIG. 7b, the continuous web 40 of susceptor material, and hence the susceptor patches 28, have a width which is less than a width of the continuous strip 218 of aerosol generating substrate 10. For example, the continuous web 40 of susceptor material, and hence the susceptor patches 28, can have a width of between approximately 0.1 mm and 7 mm. In some embodiments, the susceptor patches 28 can have a length of between approximately 5 mm and 50 mm in the direction of travel of the continuous web 40 of susceptor material and can have a thickness of between approximately 1 μm and 500 μm.

In order to minimise soiling of the susceptor cutting unit 48 by the adhesive 47 applied to the continuous web 40 of susceptor material by the adhesive applicator unit 46, the susceptor cutting unit 48 cuts the continuous web 40 of susceptor material in the adhesive-free areas 62, that is at positions between the adhesive areas 60 on the surface of the continuous web 40 of susceptor material. This can be achieved by synchronising the operation of the susceptor cutting unit 48 with the movement of the continuous web of susceptor material.

Susceptor Patch Application

Figure 8:
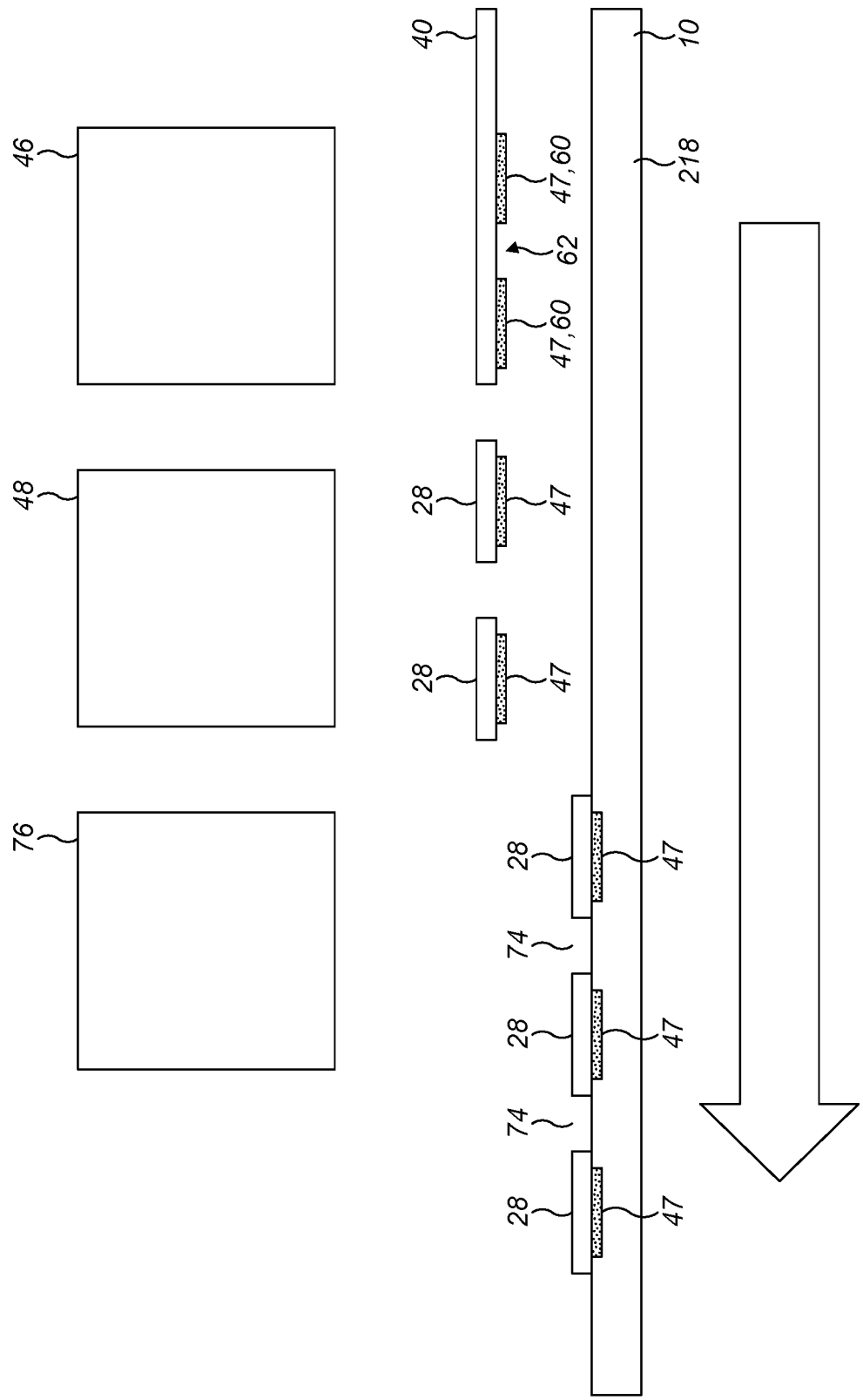

The susceptor patches 28 provided by the susceptor cutting unit 48 can be applied to the flat surface of the continuous strip 218 of aerosol generating substrate 10 so that there is a constant and predetermined spacing 74 between the edges of each successive susceptor patch 28, for example as shown in FIGS. 7b and 8. The constant and predetermined spacing 74, which may, for example, be between 1 mm and 20 mm, is achieved in the same manner described above in connection with the apparatus 30 and corresponding method.

The susceptor patches 28 with the adhesive 47 applied thereto are continuously and consecutively adhered to the flat surface of the continuous strip 218 of aerosol generating substrate 10 substantially along a centre of the continuous strip 218. Adjacent susceptor patches 28 are spaced apart in the direction of travel of the continuous strip 218 of aerosol generating substrate 10 by the constant and predetermined spacing 74 between the edges of the susceptor patches 28 that is generated when the susceptor patches 28 are formed in the susceptor cutting unit 48.

In order to ensure that there is adequate adhesion between the susceptor patches 28 and the substantially flat surface of the continuous strip 218 of aerosol generating substrate 10, the susceptor patches 28 can be pressed onto the substantially flat surface by a cam roller 76, shown diagrammatically in FIG. 7a. The rotation of the cam roller 76 is synchronized with the movement of the continuous strip 218 of aerosol generating substrate 10 so that a pressing force is applied to consecutive susceptor patches 28, but not to the spaced regions between consecutive susceptor patches 28.

Depending on the properties of the adhesive 47 applied to the continuous web 40 of susceptor material (and hence to the susceptor patches 28) by the adhesive applicator unit 46, the continuous strip 218 of aerosol generating substrate 10 and the susceptor patches 28 adhered to the surface thereof can be heated by the optional heater 50. As noted above, this may help to cure or set the adhesive 47, and thereby ensure a good bond between each susceptor patch 28 and the flat surface of the continuous strip 218 of aerosol generating substrate 10.

Strip Cutting

Figure 9:
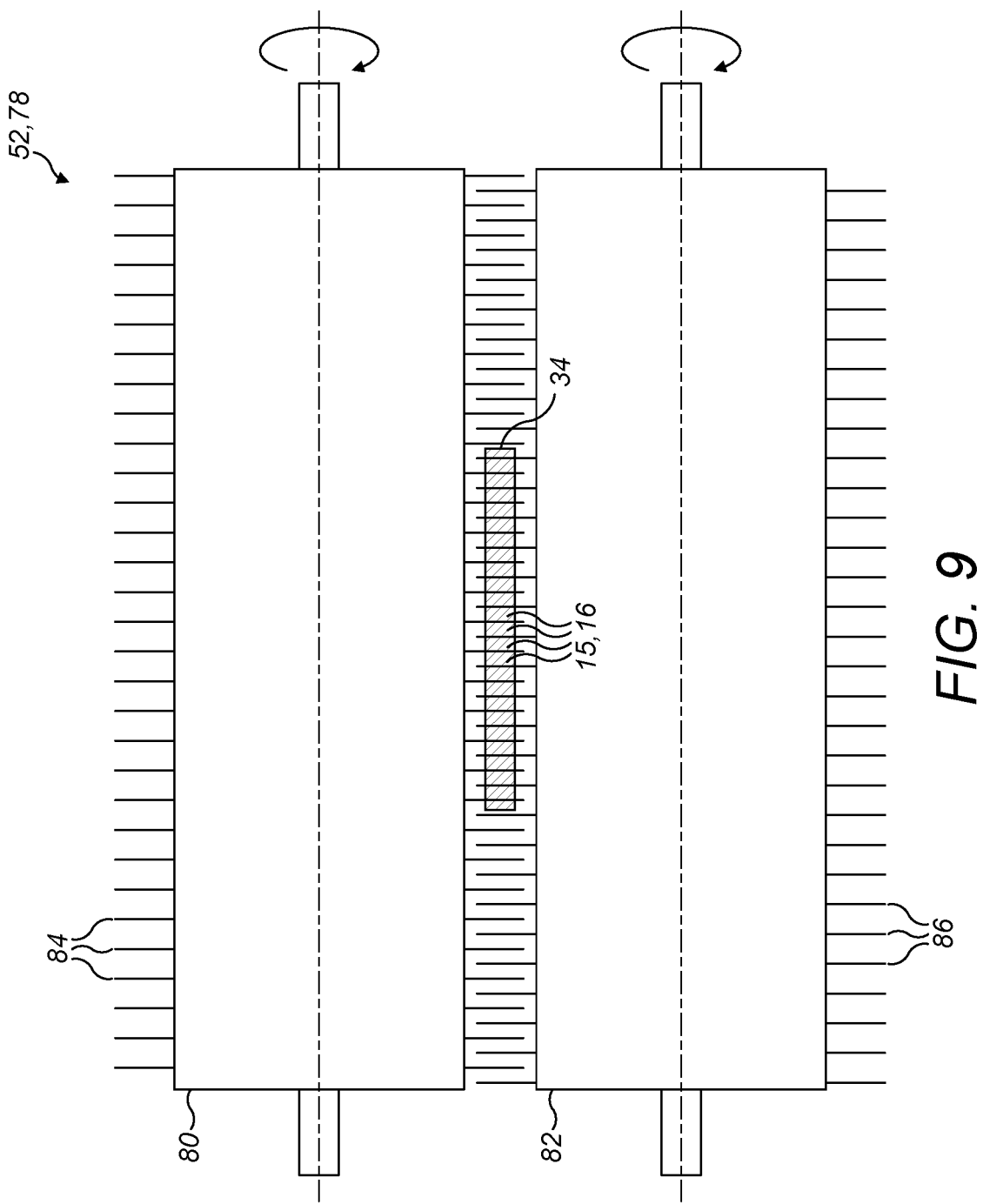

After the continuous strip 218 of aerosol generating substrate 10 has been separated from an edge 19 of the continuous web 34 of aerosol generating substrate 10 by the rotary cutter unit 290, the remaining web 34 of aerosol generating substrate 10 is fed to the strip cutting unit 52 (best seen in FIG. 9). The strip cutting unit 52 cuts the continuous web 34 of aerosol generating substrate 10 across its full width to form a plurality of continuous aerosol generating strips 16 which correspond to the elongate first strips 15 in the finished aerosol generating article 1 described above with reference to FIGS. 1a and 1b. In an embodiment, the strip cutting unit 52 cuts the continuous web 34 of aerosol generating substrate 10 to form aerosol generating strips 16 having a strip width of approximately 1 mm.

As shown in FIGS. 7a and 9, the strip cutting unit 52 is a rotary cutter unit 78 and comprises first and second cutting drums 80, 82. The first cutting drum 80 includes circumferentially extending first cutting formations 84 and the second cutting drum 82 includes circumferentially extending second cutting formations 86. The first and second cutting formations 84, 86 cooperate (e.g. intermesh) to shear cut the continuous web 34 of aerosol generating substrate 10 in the direction of travel of the continuous web 34 to form the plurality of aerosol generating strips 16, and specifically to form the elongate first strips 15 illustrated in FIGS. 1a and 1b.

Rod Formation

The aerosol generating strips 16 formed by cutting the continuous web 34 of aerosol generating substrate 10 are conveyed to the rod forming unit 56 where they are formed into a continuous rod 88. The continuous strip 218 of aerosol generating substrate 10 with the adhered susceptor patches 28 is also conveyed to the rod forming unit 56 by the feed rollers 51 and is combined with the aerosol generating strips 16 to form the continuous rod 88. If desired, a continuous sheet of wrapping paper (not shown) can be supplied to the rod forming unit 56 from a supply reel (not shown) or can be supplied to a separate wrapping unit (again from a supply reel) which can be positioned downstream of the rod forming unit 56. As the sheet of wrapping paper is transported and guided through the rod forming unit 56 or the separate wrapping unit, it can be wrapped around the aerosol generating strips 16 and the susceptor patches 28 so that the continuous rod 88 is circumscribed by a wrapper 14.

Rod Cutting

The continuous rod 88 (optionally circumscribed by a wrapper 14) is then transported to the rod cutting unit 58 where it is cut at appropriate positions into predetermined lengths to form multiple aerosol generating articles 1. The aerosol generating articles 1 formed by the rod cutting unit 58 may have a length between 5 mm and 50 mm, preferably between 10 mm and 30 mm. It will be understood that this length corresponds to the length of the aerosol generating substrate 10 described above with reference to FIGS. 1a and 1b. The continuous rod 88 is preferably cut repeatedly by the rod cutting unit 58 substantially at a midpoint between the edges of the susceptor patches 28. In this way, the susceptor patches 28 are not cut by the rod cutting unit 58, thereby reducing wear on the cutting elements. Further, because the susceptor patches 28 are shorter than the aerosol generating strips 16, the ends of the individual susceptor patches 28 (i.e., the elongate second strips 13) are not visible at either end of the aerosol generating articles 1 formed by the rod cutting unit 58. It will be understood that this type of method is particularly suitable for the mass production of aerosol generating articles 1.

Final Assembly

Further units (not shown) may be arranged downstream of the rod cutting unit 58 and may be configured to provide one or more additional components such as the mouthpiece segment 20 described above and to assemble these with the individual aerosol generating articles 1 formed by the rod cutting unit 56 to form finished aerosol generating articles 1, for example of the type illustrated in FIG. 1. In this case, a separate wrapping unit may be provided downstream of the rod cutting unit 58 so that the assembled components can be simultaneously wrapped to form the finished aerosol generating articles 1. The further units may form part of the apparatus 230 or may be separate, stand-alone, units forming part of a final assembly line.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating article comprising:
a plurality of elongate first strips comprising an aerosol generating material;
at least one elongate second strip comprising an inductively heatable susceptor material; and
at least one elongate carrier strip to which the at least one elongate second strip is adhered;
wherein:
each of the plurality of elongate first strips has a width which is less than a width of the at least one elongate second strip,
a width of the at least one elongate carrier strip is greater than the width of the at least one elongate second strip, and
the plurality of elongate first strips, the at least one elongate second strip and the at least one elongate carrier strip are arranged to form a rod-shaped aerosol generating article.

2. The aerosol generating article according to claim 1, wherein the at least one elongate second strip has first and second opposite faces, and one of the first and second opposite faces is covered in its entirety by the at least one elongate carrier strip.

3. The aerosol generating article according to claim 1, wherein the at least one elongate second strip includes only one elongate second strip comprising an inductively heatable susceptor material, and the elongate second strip is located in a radially central position within the rod-shaped aerosol generating article and extends along a longitudinal axis of the rod-shaped aerosol generating article.

4. The aerosol generating article according to claim 1, wherein the at least one elongate carrier strip and the at least one elongate second strip adhered thereto define first and second regions within a cross-section of the rod-shaped aerosol generating article.

5. The aerosol generating article according to claim 4, wherein the at least one elongate carrier strip has a first major surface and a second major surface, the at least one elongate second strip is adhered to the second major surface, the first region faces the first major surface and the second region faces the second major surface.

6. The aerosol generating article according to claim 4, wherein the first and second regions both include a plurality of the plurality of elongate first strips.

7. The aerosol generating article according to claim 1, wherein each of the plurality of elongate first strips has a distal end and the at least one elongate second strip has a distal end, the distal ends of the plurality of elongate first strips form a distal end of the aerosol generating article, and the distal end of the at least one elongate second strip is positioned inwardly from the distal ends of the plurality of elongate first strips so that the distal end of the at least one elongate second strip is not visible at the distal end of the aerosol generating article.

8. The aerosol generating article according to claim 1, wherein a length of the at least one elongate second strip is less than a length of each of the plurality of elongate first strips.

9. The aerosol generating article according to claim 1, wherein a length of the at least one elongate carrier strip is equal to a length of each of the plurality of elongate first strips.

10. The aerosol generating article according to claim 1, wherein the at least one elongate carrier strip comprises an aerosol generating material.

11. The aerosol generating article according to claim 1, further comprising a filter segment at a proximal end of the aerosol generating article and at least one tubular segment upstream of the filter segment.

12. The aerosol generating article according to claim 1, wherein the plurality of elongate first strips has a plurality of different orientations within a cross-section of the rod-shaped aerosol generating article.

13. The aerosol generating article according to claim 1, wherein the at least one elongate second strip has a thickness between 1 μm and 500 μm.

14. The aerosol generating article according to claim 1, wherein each of the plurality of elongate first strips has a length between 5 mm and 50 mm.

15. The aerosol generating article according to claim 1, wherein each of the plurality of elongate first strips has a thickness between 50 μm and 500 μm.

16. The aerosol generating article according to claim 1, wherein the at least one elongate second strip has a thickness between 10 μm and 100 μm.

17. The aerosol generating article according to claim 1, wherein each of the plurality of elongate first strips has a length between 10 mm and 30 mm.

18. The aerosol generating article according to claim 1, wherein each of the plurality of elongate first strips has a thickness between 150 μm and 300 μm.

* * * * *